United States Patent Office 3,256,177
Patented June 14, 1966

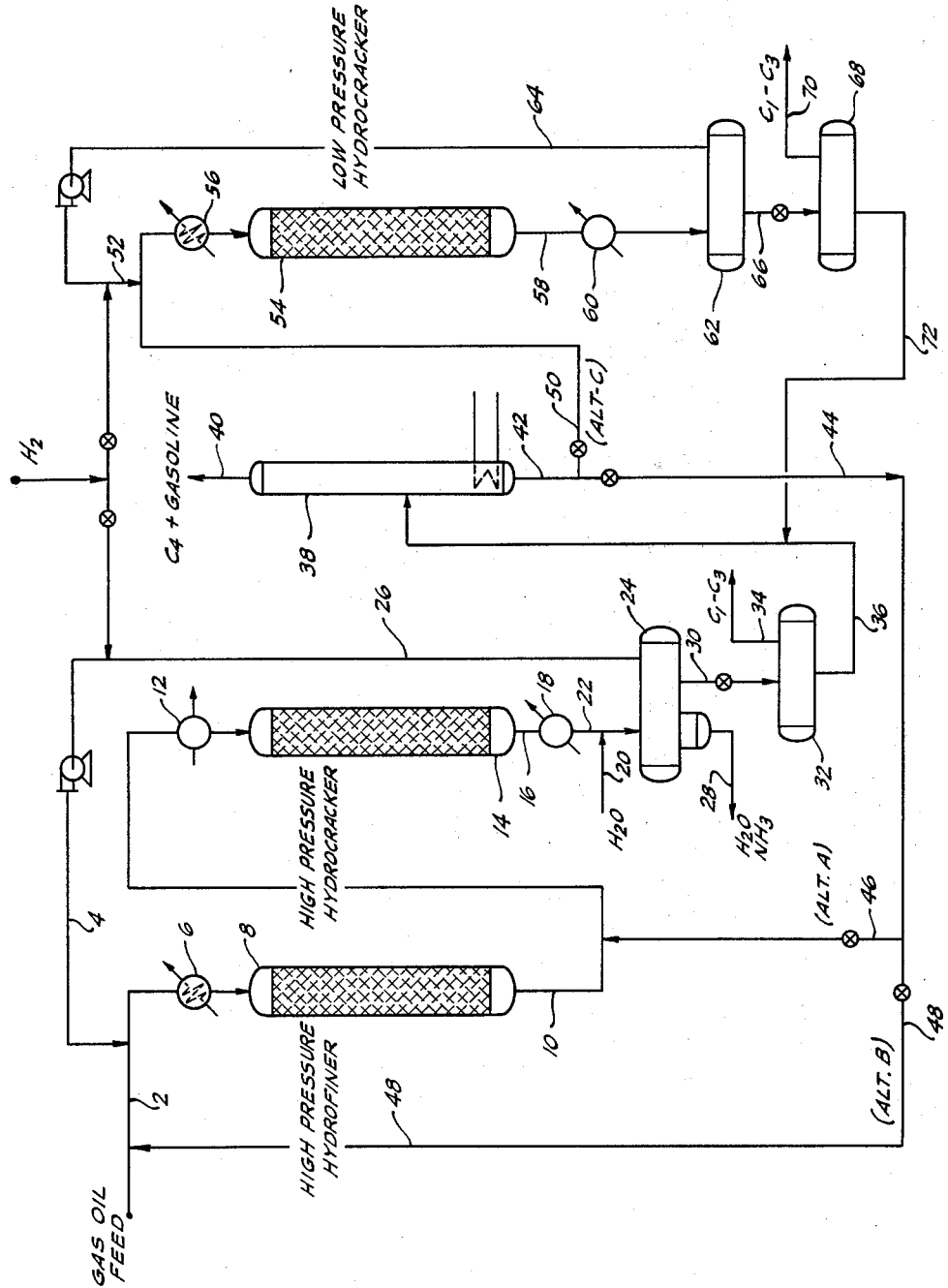

3,256,177
HYDROCRACKING PROCESS
Anthony J. Tulleners, Fullerton, Cloyd P. Reeg, Orange, and Frank C. Price, Tustin, Calif., assignors to Union Oil Company of California, Los Angeles, Calif., a corporation of California
Filed Nov. 3, 1964, Ser. No. 408,581
13 Claims. (Cl. 208—89)

This application is a continuation-in-part of application Serial No. 142,182, filed October 2, 1961, now U.S. Patent No. 3,159,568, which in turn is a continuation-in-part of application Serial No. 5,913, filed February 1, 1960, and now abandoned.

This invention relates to novel methods for carrying out the catalytic hydrocracking of nitrogen-containing hydrocarbon feedstocks to produce therefrom lower boiling hydrocarbons, boiling for example in the gasoline or jet fuel range. The process is designed especially for the hydrocracking of refractory mineral oil feedstocks comprising heavy hydrocarbons and nitrogen compounds boiling above about 700° F., while maintaining the catalyst at high activity levels for relatively long periods of time between regenerations.

Briefly, the process comprises first subjecting the feed to a catalytic prehydrogenation, or "hydrofining" treatment at pressures above about 2,000 p.s.i.g. to effect decomposition of organic nitrogen and sulfur compounds, then subjecting the ammonia-containing hydrofining effluent to catalytic hydrocracking at a pressure not substantially below the hydrofining pressure, and in the presence of a catalyst comprising a Group VIII hydrogenating metal component, preferably a Group VIII noble metal, supported on a crystalline zeolite cracking base of the molecular sieve type wherein the zeolitic cations are predominantly hydrogen ions and/or polyvalent metal ions. The effluent from this hydrocracking step is then condensed and purified, as by washing with water to remove ammonia, and fractionated to recover the desired products. The unconverted residue may then be reheated and recycled to the hydrocracker, or to the hydrofiner, or it may be hydrocracked in a second-stage hydrocracking zone operated at relatively lower temperatures and pressures than the first hydrocracking zone.

If two hydrocracking stages are employed, the condensed and depressured effluent from both stages may, if desired, be admixed and fractionated to recover the net gasoline production from both stages, and the unconverted oil from both stages. The unconverted oil is then preferably recycled to the second hydrocracking stage.

As a result of the increasing demand for light motor fuels, and the decreasing demand for heavier petroleum products such as fuel oil and the like, there is much current interest in more efficient methods for converting the heavier products of refining into gasoline. The conventional methods of accomplishing this such as catalytic cracking, coking, thermal cracking and the like always result in the production of a more highly refractory unconverted oil, or cycle oil, which heretofore could not be economically converted to gasoline. It is known that such refractory materials can be converted to gasoline by catalytic hydrocracking. However, the application of the hydrocracking technique has in the past been very limited due to the expense involved, especially with respect to heavy, nitrogen-containing feedstocks.

The principal problem in hydrocracking these heavy, nitrogen-containing feeds centers around the troublesome dilemma of how to make the catalyst work efficiently, i.e., give high conversions per unit of catalyst, without undergoing rapid deactivation by nitrogen compounds, and without resorting to expensive, separate prehydrofining to remove nitrogen and/or to large, high-pressure treating units. Previous attempts to apply hydrocracking have failed in at least one of these respects.

In our copending application Serial No. 142,182, filed October 2, 1961, we have shown that the expensive separate prehydrofining of nitrogen-containing feedstocks can be avoided, while still operating at economical low pressures below about 2,000 p.s.i.g., by adopting the "integral" hydrofining-hydrocracking system. In this system, the feed is first subjected to conventional catalytic hydrofining, and the effluent therefrom is transferred directly to the hydrocracker without the intervening condensation, washing to remove ammonia, reheating and repressuring steps which constitute a major portion of the expense involved in conventional, non-integral prehydrofining.

This integral system, operating at below 2,000 p.s.i.g., provides in all cases a major saving in capital investment and operating expenses, due to the elimination of interstage treatment between the hydrofiner and the hydrocracker. However, difficulties of another nature are encountered in this low-pressure operation when heavy, high-nitrogen feedstocks are employed. In the case of these heavy oils, which may contain 5-50% of material boiling above 700° F. and typically about 0.05-2% by weight of nitrogen, adequate hydrofining, i.e. adequate to reduce the organic nitrogen content to less than about 25 parts per million, becomes very difficult at pressures below 2,000 p.s.i.g. Heavy organic nitrogen compounds remaining in the feed are very detrimental to hydrocracking catalyst activity.

Increased hydrofining severity to overcome this problem can be attained with difficulty by raising temperature, or by operating at very low space velocities. The first of these alternatives leads to rapid hydrofining catalyst deactivation rates, and the second to prohibitively large reactors and catalyst volumes for a given feed throughput. It has now been found that the decomposition rate of heavy organic nitrogen compounds during hydrofining is very sensitive to hydrogen partial pressure, and that moderate pressure increases from e.g. 1,500 p.s.i.g. to 2,500 p.s.i.g., give very marked improvement in denitrogenation rates. Operating the hydrofiner at increased pressures, above about 2,000 p.s.i.g., has been found to be the most economical solution to the problem of adequate denitrogenation of heavy, high-nitrogen feedstocks.

However, this solution leads to other problems when the hydrofiner is integrated as described in series with a hydrocracker. In this integral system, it is a practical necessity to operate the hydrocracker at substantially the same pressure as the hydrofiner; to raise the pressure of the hot hydrofiner effluent is a practical impossibility, and to reduce the pressure substantially leads to the very expensive requirement of repressuring recycle gas from the low-pressure hydrocracker effluent back to the high-pressure hydrofiner. Given then the requirement of operating the hydrocracker also at high pressures, it becomes necessary to minimize the reactor size if the high-pressure approach to the overall problem is to be economically feasible. It has been found that the key to this problem lies in the nature of the hydrocracking catalyst employed.

The molecular sieve hydrocracking catalysts employed herein have been found to be much more active on a volume basis for hydrocracking in the presence of ammonia, than the more conventional hydrocracking catalysts based on amorphous co-gel cracking bases such as silica-alumina. This high activity in the presence of ammonia is a critical factor in the process of this invention, since the ammonia partial pressure in the hydrocracker is high, both as a result of the high initial nitrogen content of the feeds, and the higher total pressure at which the hydrocracker is operated. To operate successfully with conventional hydrocracking catalysts at these partial pressures of ammonia, it is necessary to reduce liquid hourly space velocities to values in the order of about 0.2 to 0.5, entailing extremely large hydrocracking reactors which become prohibitively expensive when designed for the high-pressure operation required. On the other hand, when employing molecular sieve type catalysts, successful operation can be maintained at LHSV values in the range of about 0.8–3.0 requiring not more than about half, and usually less than one-fourth, the reactor volume needed in the case of conventional hydrocracking catalysts. This marked reduction in reactor size renders the high-pressure integral system practical where it otherwise would be impractical.

The process will now be described with reference to the attached drawing, which is a flowsheet illustrating the invention in several of its preferred aspects. The initial gas oil feedstock is brought in through line 2 and blended with fresh and recycle hydrogen from line 4. The mixture is then preheated to suitable hydrofining temperatures in preheater 6, and passed into high-pressure catalytic hydrofiner 8.

In hydrofiner 8 the feed plus hydrogen is contacted with a suitable sulfactive hydrofining catalyst under conditions of hydrofining. The catalyst may comprise any of the oxides and/or sulfides of the transitional metals, and especially an oxide or sulfide of a Group VIII metal (particularly cobalt or nickel) mixed with an oxide or sulfide of a Group VI-B metal (preferably molybdenum or tungsten). Such catalysts preferably are supported on an adsorbent carrier in proportions ranging between about 2% and 25% by weight. Suitable carriers include in general the difficultly reducible inorganic oxides, e.g., alumina, silica, zirconia, titania, clays such as bauxite, bentonite, etc. Preferably the carrier should display little or no cracking activity, and hence highly acidic carriers having a Cat-A cracking activity above about 20 are to be avoided. The preferred carrier is activated alumina, and especially activated alumina containing about 3–15% by weight of coprecipitated silica gel.

The preferred hydrofining catalyst consists of nickel sulfide or oxide plus molybdenum sulfide or oxide supported on silica-stabilized alumina. Compositions containing between about 1% and 5% of Ni, 3% and 20% of Mo, 3% and 15% of $SiO_2$, and the balance $Al_2O_3$, and wherein the atomic ratio Ni/Mo is between about 0.2 and 4, are specifically contemplated.

Suitable hydrofining conditions are as follows:

|  | Broad Range | Preferred Range |
| --- | --- | --- |
| Average Bed Temp., ° F | 600–850 | 650–750 |
| Pressure, p.s.i.g | 2,000–4,000 | 2,000–3,000 |
| Liquid Hourly Space Velocity | 0.5–20 | 0.8–5 |
| Hydrogen Ratio, M s.c.f./b | 0.5–20 | 4–12 |

The above conditions should be suitably correlated so as to reduce the organic nitrogen content of the feed to below about 60, and preferably below 25, parts per million.

The effluent from hydrofiner 8 is withdrawn through line 10 and transferred via heat exchanger 12 to high-pressure hydrocracker 14, in which is disposed a bed of granular hydrocracking catalyst. Heat exchanger 12 serves either to heat or cool the hydrofiner effluent, depending upon the desired temperature differential between the outlet of hydrofiner 8 and the inlet of hydrocracker 14. It will be apparent that the feed to hydrocracker 14 will contain all of the nitrogen and sulfur which was present in the initial feed, nearly all of which will have been converted to ammonia and hydrogen sulfide in hydrofiner 8.

The hydrocracking conditions to be employed in hydrocracker 14 will depend upon the refractoriness of the feed, its nitrogen content, the pressure, and the desired conversion per pass, as well as the relative activity of the catalyst. In general, for feeds containing (before hydrofining) from 0.01% to 2% of nitrogen, suitable hydrocracking conditions may be selected within the following ranges:

HIGH-PRESSURE HYDROCRACKING CONDITIONS

|  | Broad Range | Preferred Range |
| --- | --- | --- |
| Average Bed Temp., ° F.: |  |  |
| Start of Run | 600–800 | 700–775 |
| End of Run | 650–875 | 750–850 |
| Pressure, p.s.i.g | 1,800–4,000 | 2,000–3,000 |
| LHSV, v./v./hr | 0.5–10 | 0.8–5 |
| $H_2$/oil, M s.c.f./b | 0.5–20 | 4–12 |

The above conditions, particularly temperature and space velocity, are suitably adjusted and correlated so as to provide about 30–70 volume-percent conversion to products boiling below the initial boiling point of the feedstock. The pressure is preferably not more than about 200 p.s.i. above or below the pressure in the hydrofiner.

The effluent from hydrocracker 14 is withdrawn via line 16, condensed in condenser 18, then mixed with wash water injected via line 20 into line 22, and the entire mixture is then transferred to high-pressure separator 24. Sour recycle hydrogen is withdrawn via line 26, and aqueous wash water containing dissolved ammonia and some of the hydrogen sulfide is withdrawn via line 28. The liquid hydrocarbon phase in separator 24 is then flashed via line 30 into low-pressure separator 32, from which flash gases comprising methane, ethane, propane and the like are withdrawn via line 34. The liquid hydrocarbons in separator 32 are then transferred via line 36 to fractionating column 38.

In fractionating column 38, the $C_4{}^+$ hydrocarbon condensate is fractionated so as to recover overhead via line 40, a gasoline product boiling up to about 350–400° F., and a gas oil bottoms fraction via line 42. The gas oil bottoms fraction is treated according to one of three major alternate schemes, designated as (A), (B), or (C).

According to alternate (A), it is recycled via lines 44 and 46 back to hydrocracker 14 for further conversion to gasoline. This results in a single-stage hydrocracking process which requires none of the additional equipment illustrated. The single-stage operation is desirable for small units, and/or where the initial feed is relatively low in nitrogen and is otherwise non-refractory. It is normally disadvantageous, however, for large-scale operations, because the efficiency of conversion to gasoline is lower in a single-stage process.

According to alternate (B), which provides another type of single-stage operation, the unconverted oil in line 42, or a portion thereof, is recycled via lines 44 and 48 to hydrofiner 8. This modification is useful primarily in cases where a highly aromatic feedstock is employed, and it is desired to prevent the buildup of heavy aromatic hydrocarbons in the unconverted oil. This is accomplished by subjecting the recycle oil to hydrogenation in both reactors, 8 and 14, instead of in reactor 14 only as in alternate (A).

To provide for maximum economy and efficiency in large-scale operations, alternate (C) may be utilized. In this alternate, the bottoms fraction from column 38 is diverted into line 50, blended with fresh and recycle hydrogen from line 52, and the mixture is then passed to low-pressure hydrocracker 54 via pre-heater 56. The oil which is thus treated in hydrocracker 54 is considerably less refractory than the feed which was treated in the first-stage hydrocracker, and is free of ammonia. Hence, it is found that a higher conversion per pass can normally be maintained in the second-stage hydrocracker than in the first stage without encountering rapid catalyst deactivation, even at the lower pressures employed. Here again the hydrocracking is initiated with fresh catalyst at a suitably low temperature, and the temperature is gradually raised over a period of several months to maintain relatively constant conversion, preferably about 40 to 80% per pass to 400/ F. end-point gasoline.

The process may be operated with equal or different run lengths in each hydrocracking reactor. If the run lengths are unequal, as is normally the case where each stage is operated at maximum efficiency levels, a standby reactor may be provided into which the feed to whichever stage becomes next deactivated can be diverted. With this "switch" type of operation, maximum catalyst treating efficiency is generally obtainable, at the expense of providing a third reactor.

The hydrocracking conditions to be employed in the second stage will depend mainly upon the activity of the catalyst, the desired conversion per pass, the boiling range of the feed, and the particular products desired. In general suitable operating conditions may be selected within the following ranges:

SECOND-STAGE HYDROCRACKING CONDITIONS

|  | Broad Range | Preferred Range |
| --- | --- | --- |
| Average Bed Temp., ° F.: |  |  |
| Start of Run | 450–800 | 550–700 |
| End of Run | 600–875 | 750–850 |
| Pressure, p.s.i.g | 400–3,000 | 500–2,000 |
| LHSV, v./v./hr | 1.0–20 | 2–12 |
| H₂/oil, M s.c.f./b | 0.5–20 | 4–12 |

Effluent from hydrocracker 54 is withdrawn via line 58, condensed in condenser 60, and transferred to high-pressure separator 62, from which hydrogen-rich recycle gas is withdrawn via line 64. High-pressure condensate in separator 62 is flashed via line 66 into low-pressure separator 68, from which light hydrocarbon gases are exhausted via line 70. Liquid condensate in separator 68 is then transferred via lines 72 and 44 to fractionating column 38 for recovery of the second-stage gasoline product along with the first-stage gasoline.

Successful operation of the process described above depends critically upon the type of catalyst employed in high-pressure hydrocarbon 14. This catalyst must, as noted, comprise a highly active zeolite cracking base, upon which is supported a Group VIII metal hydrogenating component. The most critical aspect of these catalysts resides in the nature of the zeolite cracking base. These crystalline, siliceous zeolites are sometimes referred to in the art as molecular sieves, and are composed usually of silica, alumina and one or more exchangeable cations such as sodium, hydrogen, magnesium, calcium, etc. They are further characterized by crystal pores of relatively uniform diameter between about 4 and 14 A. It is preferred to employ molecular sieve zeolites having a relatively high $SiO_2/Al_2O_3$ mole-ratio, between about 3.0 and 12, and even more preferably between about 4 and 8. Suitable zeolites found in nature include for example mordenite, stilbite, heulandite, ferrierite, dachiardite, chabazite, erionite, and faujasite. Suitable synthetic molecular sieve zeolites include for example those of the "B," "X," "Y" and "L" crystal types, or synthetic forms of the natural zeolites noted above, especially synthetic mordenite. The preferred zeolites are those having crystal pore diameters between about 8–12 A., wherein the $SiO_2/Al_2O_3$ mole-ratio is between about 3 and 6, and the average crystal size is less than about 10 microns along the major dimension. A prime example of a zeolite falling in this preferred group is the synthetic Y molecular sieve.

The naturally occurring molecular sieve zeolites are normally found in a sodium form, an alkaline earth metal form, or mixed forms. The synthetic molecular sieves normally are prepared first in the sodium form. In any case, for use as a cracking base it is preferred that most or all of the original zeolitic monovalent metals be ion-exchanged out with a polyvalent metal, or with an ammonium salt followed by heating to decompose the zeolitic ammonium ions, leaving in their place hydrogen ions and/or exchange sites which have actually been decationized by further removal of water:

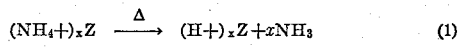

(1)

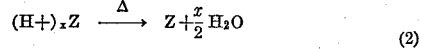

(2)

Mixed polyvalent metal-hydrogen zeolites may be prepared by ion exchanging first with an ammonium salt, then partially back-exchanging with a polyvalent metal salt, and then calcining. In some cases, as in the case of synthetic mordenite, the hydrogen forms can be prepared by direct acid treatment of the alkali metal sieves. Hydrogen or "decationized" Y sieve zeolites of this nature are more particularly described in Belgian Patents Nos. 598,582, 598,682, 598,683, and 598,686, and U.S. Patent No. 3,130,006.

There is some uncertainty as to whether the heating of the ammonium zeolites produces a hydrogen zeolite or a truly decationized zeolite, but it is clear that, (a) hydrogen zeolites are formed upon initial thermal decomposition of the ammonium zeolite, and (b) if true decationization does occur upon further heating of the hydrogen zeolites, the decationized zeolites also possess desirable catalytic activity. Both of these forms, and the mixed forms are designated herein as being "metal-cation-deficient." The preferred cracking bases are those which are at least about 10%, and preferably at least 20%, metal-cation-deficient, based on the initial ion-exchange capacity. A specifically desirable and stable class of zeolites are those wherein at least about 20% of the ion-exchange capacity is satisfied by hydrogen ions, and at least about 10% by divalent metal ions such as magnesium, calcium, zinc, etc.

The essential active metals employed herein as hydrogenation components are those of Group VIII, i.e., iron, cobalt, nickel, ruthenium, rhodium, palladium, osmium, iridium and platinum, or mixtures thereof. The noble metals are preferred, and particularly palladium and platinum. In addition to these metals, other promoters may also be employed in conjunction therewith, including the metals of Groups VI-B and VII-B, e.g., molybdenum, chromium, manganese, etc.

The amount of hydrogenating metal in the catalyst can vary within wide ranges. Broadly speaking, any amount between about 0.1% and 20% by weight may be used. In the case of the noble metals, it is normally preferred to use about 0.2% to 2% by weight. The preferred method of adding the hydrogenating metal is by ion exchange. This is accomplished by digesting the zeolite, preferably in its ammonium form, with an aqueous solution of a suitable compound of the desired metal wherein the metal is present in a cationic form, as described for example in Belgian Patent No. 598,686.

Following addition of the hydrogenating metal, the resulting catalyst powder is then filtered off, dried, pelleted with added lubricants, binders, or the like if desired, calcined at temperatures of e.g. 700–1,200° F. in order to activate the catalyst and decompose zeolitic ammonium ions. The foregoing catalysts may be employed in undiluted form, or the powdered catalyst may be mixed and copelleted with other relatively less active adjuvants, diluents or binders such as activated alumina, silica gel, coprecipitated silica-alumina cogel, magnesia, activated clays and the like in proportions ranging between about 5% and 50% by weight. These adjuvants may be employed as such, or they may contain a minor proportion of an added hydrogenating metal, e.g. a Group VI-B and/or Group VIII metal.

At the end of a hydrocracking run, the deactivated catalyst may be regenerated in the conventional manner by oxidation at e.g. 700–1,000° F. using air or other oxygen-containing gases.

The catalyst employed in low-pressure hydrocracker 54 is preferably the same as described above for the high-pressure hydrocracker. However, since the feed to the low-pressure unit is nitrogen-free, and since larger reactors are more economically feasible at the lower pressures employed, the more conventional amorphous type hydrocracking catalysts may also be employed at relatively lower space velocities. These amorphous catalysts may comprise a minor proportion of a Group VI-B and/or Group VIII metal deposited upon co-precipitated composites of silica-alumina, silica-magnesia, silica-zirconia, alumina-boria, silica-titania, silica-zirconia-titania; acid treated clays and the like, acidic metal phosphates such as aluminum phosphate may also be employed. Any of these amorphous catalysts may be further activated by the addition of a minor proportion of an acidic halide such as HF, $BF_3$, $SiF_4$, or the like.

Feedstocks which may be employed herein include in general any nitrogen-containing mineral oil fraction boiling above the boiling range of the desired product. For purposes of gasoline production, the primary feedstocks comprise straight-run gas oils, coker distillate gas oils, deasphalted crude oils, cycle oils derived from catalytic or thermal cracking operations and the like. These feedstocks may be derived from petroleum crude oils, shale oils, tar sand oils, coal hydrogenation products and the like. Specifically, it is preferred to use feedstocks boiling between about 400° and 1,000° F., containing at least about 5% by volume of material boiling above 700° F., and at least about 0.02% by weight of total nitrogen.

The following examples are cited to illustrate certain adaptations of the invention and the results obtainable, but are not to be construed as limiting in scope.

*Example I*

This example illustrates suitable conditions and results obtainable in a hydrocracking run using the two-stage contacting technique illustrated in the drawing, with all recycle oil being sent to the second stage (alternate "C"). The feedstock is a blend of catalytic cracking cycle oil and straight-run and coker distillate gas oils, the principal characteristics of which are as follows:

Boiling range, ° F. _____ 400–890
Gravity, ° API _____ 21
Sulfur content, wt. percent _____ 1.3
Nitrogen content, wt. percent _____ 0.28
Wt. percent aromatics _____ 40

The feed is passed first over a hydrofining catalyst consisting of the sulfided equivalent of 3% nickel oxide and 15% molybdenum oxide, supported on an alumina carrier stabilized by the addition of about 5% $SiO_2$. Beginning-of-run hydrofining conditions are as follows:

Temperature (av. bed), ° F. _____ 735
Pressure, p.s.i.g. _____ 2,400
Liquid hourly space velocity _____ 1.25
Hydrogen/oil ratio, s.c.f./b. _____ 10,000

Under these conditions, total organic nitrogen content of the resulting hydrofined oil is about 8–10 p.p.m. The total hydrofining effluent is passed continuously into a first-stage hydrocracking reactor filled with a catalyst comprising 0.5% palladium ion exchanged onto a magnesium-hydrogen form of a Y molecular sieve zeolite having a $SiO_2/Al_2O_3$ mole-ratio of 4.7 and a $MgO/Al_2O_3$ mole-ratio of 0.4.

The effluent from the first stage of hydrocracking is condensed while simultaneously washing with water to remove ammonia. Hydrogen-rich recycle gas is recovered and recycled to the hydrofining step. The liquid condensate is fractionated to recover the first-stage gasoline product boiling up to about 400° F. The residue of oil boiling above 400° F. is then passed through the second hydrocracking reactor, which is filled with the same hydrocracking catalyst, and the effluent product is fractionated to recover 400° F. end-point gasoline, the residue being recycled back to the second stage. Start-of-run conditions in the first and second hydrocracking stages are as follows:

| | First Stage | Second Stage |
|---|---|---|
| Temperature, ° F. (Av. Bed) | 725 | 600 |
| Pressure, p.s.i.g. | 2,400 | 1,500 |
| Liquid Hourly Space Velocity | 1.7 | 2.0 |
| $H_2$/Oil Ratio, s.c.f./b. | 10,000 | 8,000 |
| Conversion per Pass to 400° F. End-Point Material | 40 | 60 |

Product distribution and yields under the above conditions are approximately as follows:

Dry Gas Make ($C_1$–$C_3$) s.c.f./b. fresh feed _____ 120
Liquid yields, vol. percent of fresh feed:
    Butanes _____ 15
    Pentanes _____ 13
    $C_6$ _____ 15
    $C_7$–400° F. gasoline _____ 82

Total $C_4$–400° F. gasoline _____ 125

Operation as described above can be continued for a total run length of at least about 6 months, and normally at least about 12 months, by periodically raising temperatures in the respective reactors an average of about 0.1° to 2° F. per day to compensate for catalyst deactivation while maintaining the specified conversion levels.

In a similar operation wherein the hydrofiner and first-stage hydrocracker are operated at a pressure of 1,500 p.s.i.g. instead of 2,400, the organic nitrogen content of the hydrofiner effluent rises to about 50–60 p.p.m., requiring the use of higher temperatures in the first-stage hydrocracker and materially shortening the run length between catalyst regenerations. To achieve a hydrofiner product nitrogen level in the 8–10 p.p.m. range at the lower operating pressure of 1,500 p.s.i.g. requires reducing the space velocity to about 0.75, thus increasing the size of the hydrofiner to about 1.66 times the size required for the 1.25 space velocity operation.

*Example II*

This example demonstrates the impracticality of carrying out high-pressure hydrocracking in the presence of ammonia when conventional amorphous hydrocracking catalysts are employed.

Two parallel hydrocracking runs were carried out, using as feed a hydrofined blend of gas oils having a gravity of 34.6° API, a boiling range of 400–850° F., containing about 6 p.p.m. of native organic nitrogen, and to which was added 0.9 weight-percent of sulfur as thiophene and 0.16 weight-percent of nitrogen as tertiary butyl amine. The added thiophene and tert. butyl amine break down rapidly during hydrocracking, giving hydrogen sulfide and ammonia, thus simulating a total hydrofiner effluent containing hydrogen sulfide and ammonia. Both hydrocracking runs were carried out at 1.5 LHSV, 8,000 s.c.f./b. of hydrogen, and 1,500 p.s.i.g., and the objective was to determine the hydrocracking temperature required to give 40 volume-percent conversion per pass to 400° F. end-point gasoline.

In run A the catalyst was a 0.5% Pd-Y molecular sieve composition substantially identical to that employed in Example I. In run B, the catalyst was composed of 0.5% palladium deposited upon a coprecipitated silica-alumina co-gel cracking base containing 87 weight-percent silica and 13 weight-percent alumina. Results of the two runs were as follows:

| Catalyst | Run A | Run B |
|---|---|---|
|  | Pd-Y mol. sieve | Pd-SiO$_2$-Al$_2$O$_3$ co-gel |
| Temp. Required for 40% Conversion, °F.: |  |  |
| Initial | 718 | 810 |
| After 10 Days | 721 | 837 |
| Average Daily Temp. Increase Required to Maintain Conversion, °F | 0.3 | 2.7 |

It is thus apparent that the co-gel catalyst not only deactivates much more rapidly than the molecular sieve catalyst, but that its absolute activity level is much lower. Numerous previous correlations have shown that the 100° F. (ca.) temperature advantage shown by the molecular sieve catalyst is equivalent to at least about a four-fold space velocity advantage. Thus, if run B were carried out at the same temperature as run A, and space velocity reduced to maintain the 40% conversion per pass, the required space velocity would be below about 0.375, necessitating a reactor at least four times as large as would be required at 1.5 space velocity.

While the above example shows an operating pressure of 1,500 p.s.i.g., previous experience has shown that similar differential catalyst activities do prevail at the higher operating pressures required herein.

It is not intended that the invention should be limited to the details described herein, since many variations may be made by those skilled in the art without departing from the scope or spirit of the following claims.

We claim:

1. A process for converting a mineral oil feedstock containing at least about 5% by volume of material boiling above 700° F. and at least about 0.02 weight-percent of organic nitrogen, to lower boiling hydrocarbons, which comprises:
   (1) subjecting said feedstock to catalytic hydrofining in the presence of added hydrogen and a substantially non-cracking hydrofining catalyst at elevated temperatures and at a pressure above 2,000 p.s.i.g. to effect decomposition of said organic nitrogen compounds with resultant formation of ammonia;
   (2) subjecting ammonia-containing effluent from said hydrofining step to catalytic hydrocracking at elevated temperatures and a space velocity between about 0.5 and 10, and at a pressure above about 1,800 p.s.i.g., in the presence of hydrogen and a hydrocracking catalyst comprising a minor proportion of a Group VIII metal hydrogenating component deposited upon a zeolitic alumino-silicate molecular sieve cracking base having a SiO$_2$/Al$_2$O$_3$ mole-ratio between about 3 and 12, and wherein the zeolitic cations are selected mainly from the class consisting of hydrogen ions and polyvalent metal ions; and
   (3) recovering desired low-boiling hydrocarbons from the effluent from said hydrocracking step.

2. A process as defined in claim 1 wherein said Group VIII metal hydrogenation component is a noble metal.

3. A process as defined in claim 1 wherein said Group VIII metal hydrogenation component is palladium.

4. A process as defined in claim 1 wherein said molecular sieve cracking base is a Y-crystal type having a SiO$_2$/Al$_2$O$_3$ mole-ratio between about 3 and 6, and an average crystal size less than about 10 microns along the major dimension.

5. A process as defined in claim 1 wherein the major product recovered in step (3) is gasoline.

6. A process as defined in claim 1 wherein unconverted oil from step (3) is recycled to hydrocracking step (2).

7. A process for producing gasoline from a heavy gas oil feedstock boiling above about 400° F. and containing at least about 5% by volume of material boiling above 700° F. and at least about 0.02 weight-percent of native organic nitrogen, which comprises:
   (1) subjecting said feedstock to catalytic hydrofining in the presence of hydrogen and a hydrofining catalyst having a Cat-A cracking activity index below about 20, at a pressure between 2,000 and 4,000 p.s.i.g. and a temperature and space velocity correlated to reduce the organic nitrogen content to below about 60 p.p.m. with resultant formation of ammonia;
   (2) subjecting total effluent from said hydrofining step without intervening purification to remove ammonia, to catalytic hydrocracking at a space velocity between about 0.5 and 10, and at a pressure which is (a) between about 1,800 and 4,000 p.s.i.g. and (b) within about 200 p.s.i. of the pressure employed in said hydrofining step, and at a temperature and space velocity correlated to give about 30–70 volume-percent conversion to gasoline, in the presence of a hydrocracking catalyst comprising a minor proportion of a Group VIII metal hydrogenating component deposited upon a zeolitic alumino-silicate molecular sieve cracking base having a SiO$_2$/Al$_2$O$_3$ mole-ratio between about 3 and 12, and wherein the zeolitic cations are selected mainly from the class consisting of hydrogen ions and polyvalent metal ions; and
   (3) recovering gasoline and unconverted oil from the effluent from said hydrocracking step.

8. A process as defined in claim 7 wherein said Group VIII metal hydrogenation component is a noble metal.

9. A process as defined in claim 7 wherein said Group VIII metal hydrogenation component is palladium.

10. A process as defined in claim 7 wherein said molecular sieve cracking base is a Y-crystal type having a SiO$_2$/Al$_2$O$_3$ mole-ratio between about 3 and 6, and an average crystal size less than about 10 microns along the major dimension.

11. A process as defined in claim 7 wherein said unconverted oil from step (3) is recycled to hydrofining step (1).

12. A process as defined in claim 7 wherein said unconverted oil from step (3) is recycled directly to said hydrocracking step (2).

13. A process as defined in claim 7 wherein said unconverted oil from step (3) is subjected to further hydrocracking in a second catalytic hydrocracking zone at a pressure which is (a) between about 500 and 2,000 p.s.i.g., and (b) lower than the pressure employed in said hydrocracking step (2); and at a temperature which is (c) between about 550° and 850° F., and (d) lower than the temperature employed in hydrocracking step (2).

References Cited by the Examiner

UNITED STATES PATENTS 3,159,568   12/1964   Price et al. _____ 208—89

DELBERT E. GANTZ, *Primary Examiner.*

ALPHONSO D. SULLIVAN, *Examiner.*

S. P. JONES, *Assistant Examiner.*